(12) United States Patent
Ito et al.

(10) Patent No.: US 7,940,619 B2
(45) Date of Patent: May 10, 2011

(54) OPTICAL DISK APPARATUS AND OPTICAL DISK RECORDING METHOD WITH FORMAT WARNING INFORMATION

(75) Inventors: Seigo Ito, Hanno (JP); Hiroaki Unno, Kunitachi (JP); Hisashi Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 427 days.

(21) Appl. No.: 12/129,589

(22) Filed: May 29, 2008

(65) Prior Publication Data
US 2009/0003159 A1 Jan. 1, 2009

(30) Foreign Application Priority Data

Jun. 27, 2007 (JP) ................................ 2007-169426

(51) Int. Cl.
*G11B 7/00* (2006.01)
(52) U.S. Cl. ....................................... 369/53.2
(58) Field of Classification Search ........................ None
See application file for complete search history.

(56) References Cited

U.S. PATENT DOCUMENTS

| 2001/0028317 A1* | 10/2001 | Tsutsui et al. ................. 341/50 |
| 2003/0174606 A1 | 9/2003 | Tsukihashi et al. |
| 2003/0185142 A1* | 10/2003 | Ohbi et al. ................. 369/275.3 |
| 2005/0141382 A1* | 6/2005 | Yamamuro ................. 369/53.31 |
| 2007/0047411 A1* | 3/2007 | Rivera et al. ............... 369/53.21 |

FOREIGN PATENT DOCUMENTS

| JP | 11-149643 | 6/1999 |
| JP | 2003-346428 | 12/2003 |
| JP | 2004-80196 | 3/2004 |
| JP | 2007-59011 | 3/2007 |

OTHER PUBLICATIONS

Machine Translation of Terasaki, JP 11-149643, published Jun. 2, 1999.*
Chinese Office Action dated Feb. 12, 2010 for Appln. No. 2008101090599.
Japanese Office Action dated Feb. 8, 2011 for Appln. No. 2007-169426.

* cited by examiner

*Primary Examiner* — Peter Vincent Agustin
(74) *Attorney, Agent, or Firm* — Pillsbury Winthrop Shaw Pittman, LLP

(57) ABSTRACT

According to one embodiment, there is provided an optical disk apparatus including a recording unit which irradiates an optical disk with a laser beam to record information in a first format and a second format, a generation unit which generates warning information to an optical disk apparatus capable of performing a read process in the second format while being not capable of performing the read process in the first format, the warning information warning that information is recorded in the first format in the optical disk, and a control unit which controls the recording unit to record the warning information in the second format in the optical disk apparatus when the information is recorded in the first format in the optical disk.

1 Claim, 9 Drawing Sheets

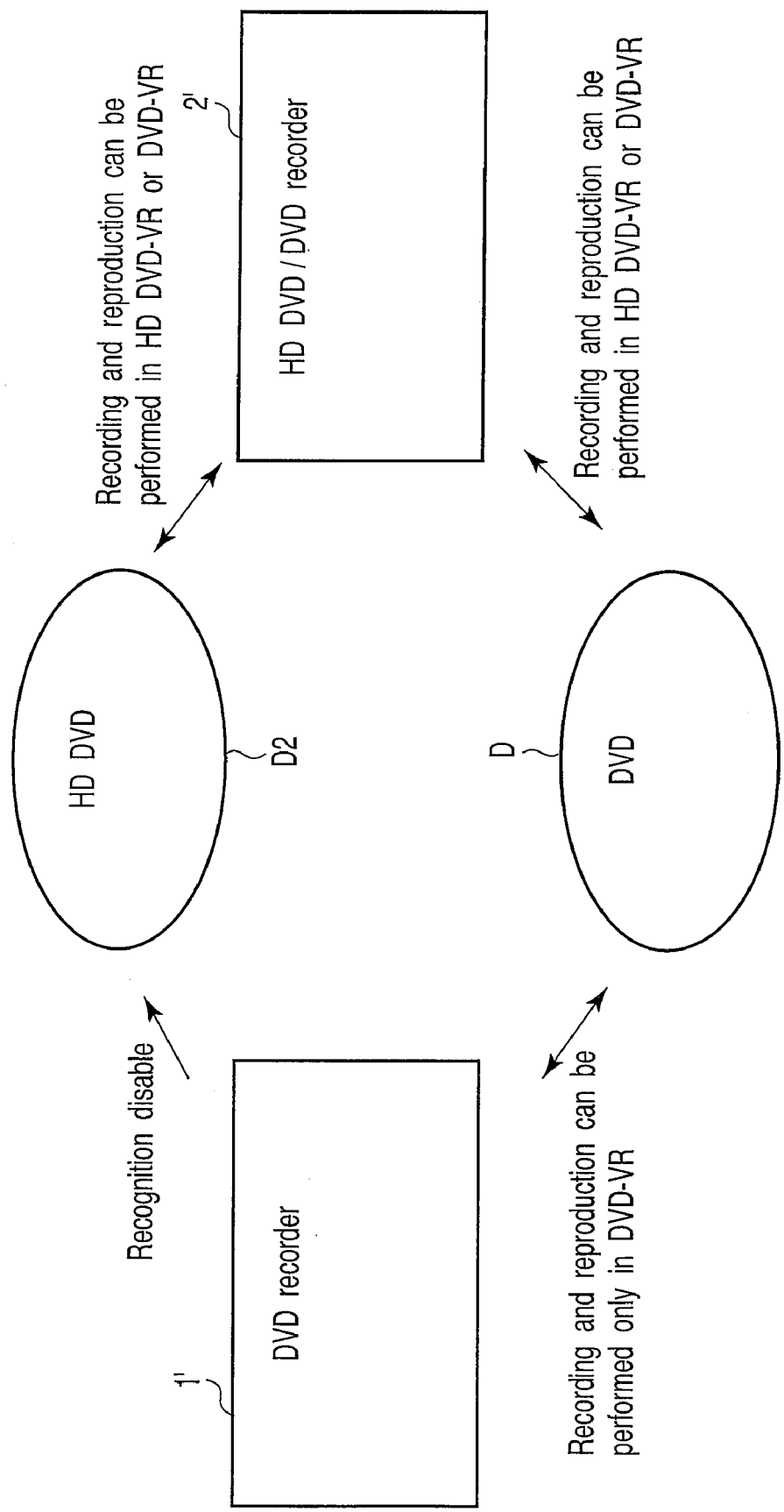
F I G. 4

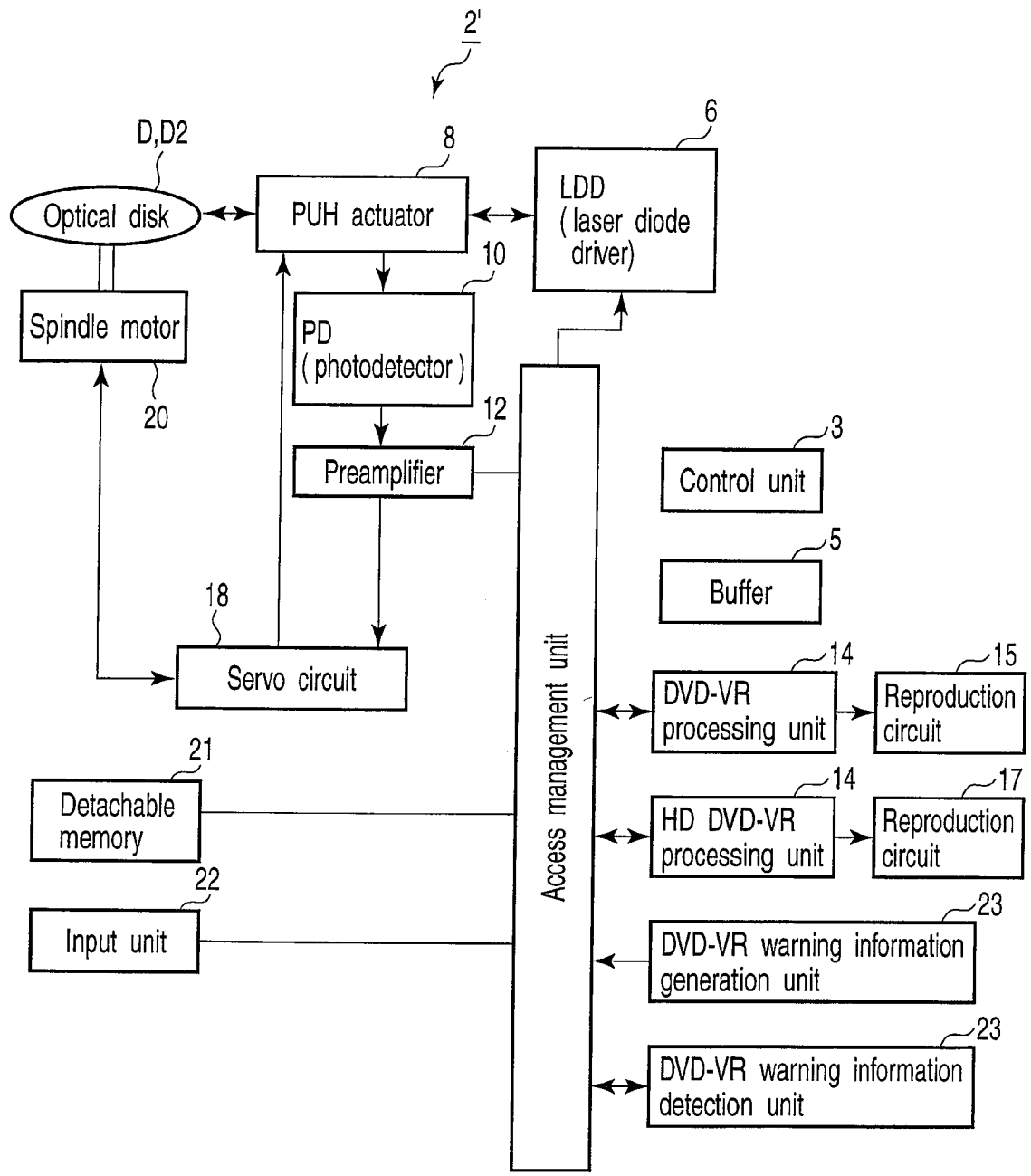
F I G. 6

| Title name | recording date and time | recording rate | time |
|---|---|---|---|
| Warning | 2008 / 1 / 10 | | 5 seconds |
| News | 2008 / 1 / 2 | | 45 minutes |
| Drama series | 2008 / 1 / 3 | | 30 minutes |
| Football live broadcast | 2008 / 1 / 4 | | 91 minutes |

Data is recorded in first format in this disk.
Although data is not displayed on second format compatible player, perform deletion or initialization after contents are confirmed with first format compatible player.

Following data is recorded in first format in this disk.
Although data is not displayed on second format compatible player, perform deletion or initialization after contents are confirmed with first format compatible player.

1. Movie "New York Walk"  2008 / 1 / 11  129 minutes
2. European concert 99'   2008 / 1 / 10  54 minutes
3. Kousien 2007 final     2007 / 8 / 30  90 minutes

OPTICAL DISK APPARATUS AND OPTICAL DISK RECORDING METHOD WITH FORMAT WARNING INFORMATION

CROSS-REFERENCE TO RELATED APPLICATION

This application is based upon and claims the benefit of priority from Japanese Patent Application No. 2007-169426, filed Jun. 27, 2007, the entire contents of which are incorporated herein by reference.

BACKGROUND

1. Field

One embodiment of the present invention relates to an optical disk apparatus in which warning information is recorded in a second format when recording is performed in a first format and an optical disk recording method.

2. Description of the Related Art

Recently, with widespread use of a digital video technology, sometimes plural formats are used for one medium. However, confusion is possibly promoted because the recording and reproduction are performed in the plural formats. Therefore, there is known a technique for a countermeasure against the promotion of the confusion.

Jpn. Pat. Appln. KOKAI Publication No. 2003-346428 discloses a technique in which, in the case where the recording is performed in different physical formats to the same kind of medium, the recording is performed in one of the physical formats to the optical disk in which the recording is performed in another physical format, whereby the optical disk cannot be recognized as a normal optical disk.

However, in the technique disclosed in Jpn. Pat. Appln. KOKAI Publication No. 2003-346428, because plural kinds of application data do not coexist on one medium, unfortunately user-friendliness is decreased even if compatibility can be removed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an explanatory view showing an example of the relationship between the optical disk apparatus of the embodiment and another optical disk apparatus;

FIG. 6 is a block diagram showing an example of a configuration of the optical disk apparatus of the embodiment;

FIG. 7 is an explanatory view showing an example of a content list shown by the optical disk apparatus of the embodiment;

FIG. 8 is an explanatory view showing an example of a warning screen generated by the optical disk apparatus of the embodiment;

FIG. 9 is an explanatory view showing another example of the warning screen generated by the optical disk apparatus of the embodiment;

DETAILED DESCRIPTION

Various embodiments according to the invention will be described hereinafter with reference to the accompanying drawings. In general, according to one embodiment of the invention, an optical disk apparatus comprising: a recording unit which irradiates an optical disk with a laser beam to record information in a first format (HD DVD-VR) and a second format (DVD-VR); a generation unit which generates warning information to an optical disk apparatus capable of performing a read process in the second format while being not capable of performing the read process in the first format, the warning information warning that information is recorded in the first format in the optical disk; and a control unit which controls the recording unit to record the warning information generated by the generation unit in the second format in the optical disk apparatus when the information is recorded in the first format in the optical disk.

An object of an embodiment of the invention is to provide an optical disk apparatus in which application data is not carelessly deleted by an irreproducible reproduction apparatus when the application data is recorded and an optical disk recording method.

In order to solve the problem, an optical disk apparatus of the embodiment is characterized by including:

a recording unit (8, 6) which irradiates an optical disk (D) with a laser beam to record information in a first format (HD DVD-VR) and a second format (DVD-VR);

a generation unit (23) which generates warning information to an optical disk apparatus capable of performing a read process in the second format while being not capable of performing the read process in the first format, the warning information warning that information is recorded in the first format in the optical disk; and a control unit (3) which controls the recording unit to record the warning information generated by the generation unit in the second format in the optical disk when the information is recorded in the first format in the optical disk.

Therefore, when application data is recorded in the medium, in order that a recording apparatus which cannot reproduce the application data does not mistakenly initialize and delete the application data, warning information is recorded in the medium in a format reproducible by the recording apparatus.

An embodiment of the invention will be described in detail with reference to the drawings.

Figure 1:
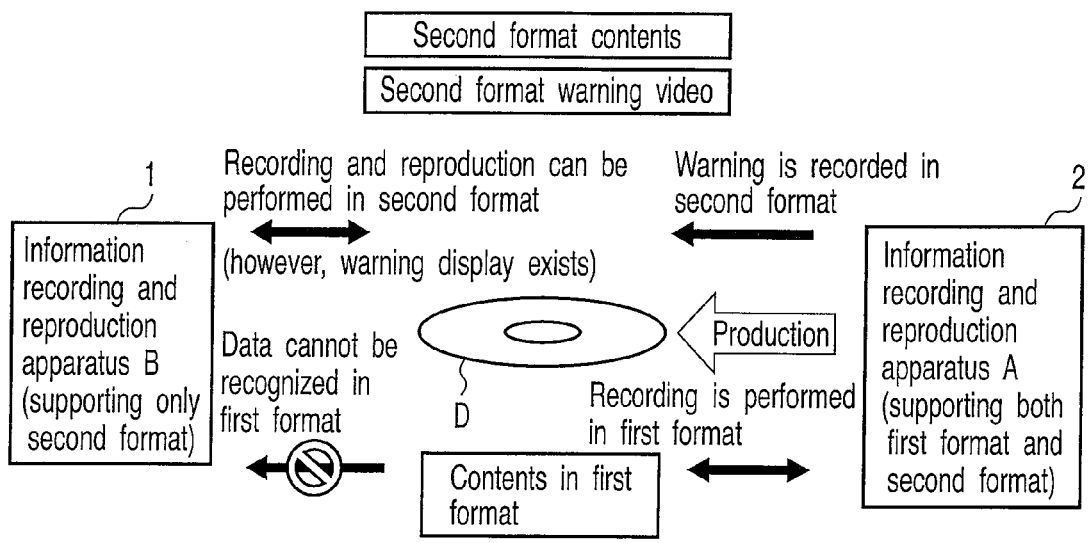
FIG. 1 is an explanatory view showing an example of a relationship between an optical disk apparatus according to an embodiment of the invention and another optical disk apparatus.
Figure 2:
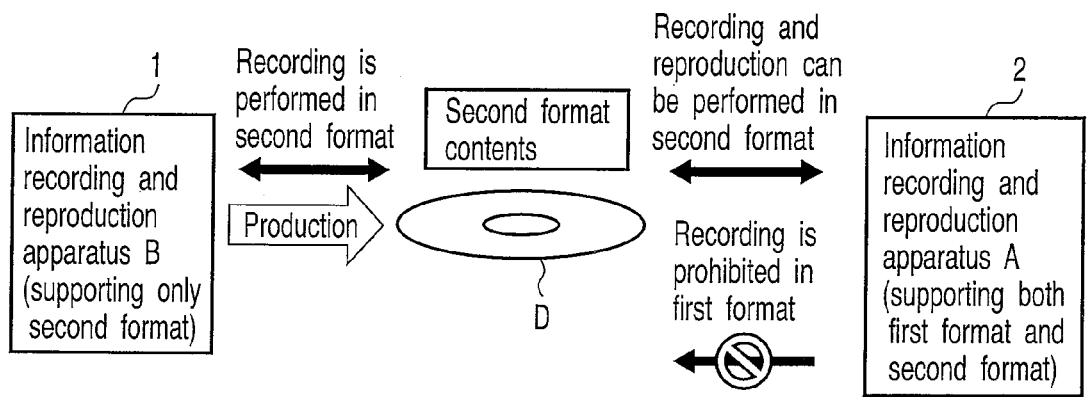
FIG. 2 is an explanatory view showing another example of the relationship between the optical disk apparatus of the embodiment and another optical disk apparatus.
Figure 3:
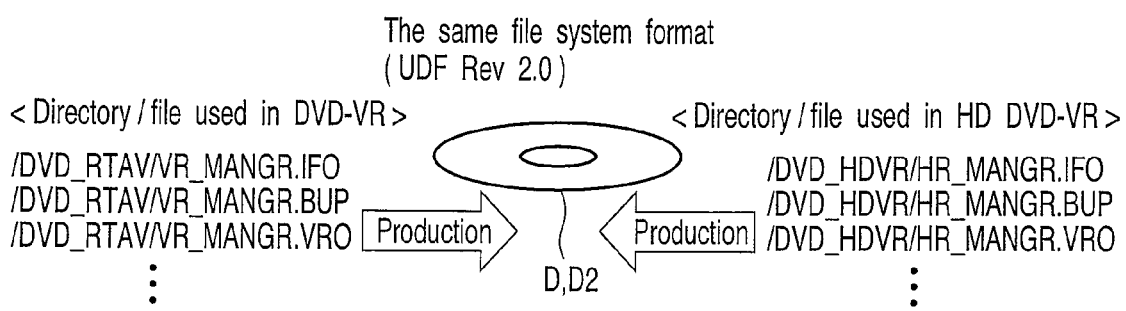
FIG. 3 is an explanatory view showing an example of a directory file generated by the optical disk apparatus of the embodiment.

The embodiment of the invention, as shown below, becomes effective between a one-format compatible information recording and reproduction apparatus 1 and a plural-format compatible information recording and reproduction apparatus 2. FIGS. 1 and 2 are explanatory views showing examples of a relationship between an optical disk apparatus of the embodiment and another optical disk apparatus. FIG. 3 is an explanatory view showing an example of a directory file generated by the optical disk apparatus of the embodiment. FIG. 4 is also an explanatory view showing an example of the relationship between the optical disk apparatus of the embodiment and another optical disk apparatus.

<Example of Relationship Between Information Recording and Reproduction Apparatus According to One Embodiment of the Invention and Another Optical Disk Apparatus>

(Outline)

For example, as shown in FIG. 1, the information recording and reproduction apparatus 2 of the embodiment is characterized in that, when contents are recorded in a first format with the information recording and reproduction apparatus 2 which can perform recording and reproduction onto a medium D in plural first and second formats, the warning information in the second format is recorded in the medium D in order that the information recording and reproduction apparatus 1 does not mistakenly delete the contents in the first format.

For example, as shown in FIG. 2, the information recording and reproduction apparatus 2 of the embodiment is characterized in that, when contents are recorded in the first format with the information recording and reproduction apparatus 2 which can perform recording and reproduction onto the medium D in the plural first and second formats, the recording of the contents is prohibited in the first format, in the case where contents in the first format do not exist on the medium D, contents in the second format exist on the medium D, and the warning information in the second format does not exist on the medium D.

For example, as shown in FIG. 3, the information recording and reproduction apparatus 2 of the embodiment, which can perform recording and reproduction onto the medium D in the plural first and second formats, uses a format of the same file system when recording contents in the first format and contents in the second format. Therefore, contents in the plural formats can be recorded in and reproduced from the same media D and D2.

For example, as shown in FIG. 4, the information recording and reproduction apparatuses 1' and 2' of the embodiment are a DVD-VR recorder 1' and an HD DVD-VR recorder 2', respectively. The DVD-VR recorder 1' can access only the optical disk D which is DVD, while the HD DVD-VR recorder 2' can perform the recording and reproduction processes to both the optical disk D which is DVD and the optical disk D2 which is HD DVD.

The information recording and reproduction apparatus 2 of the embodiment records the warning information in the second format in the optical disk D which is a legacy DVD.

Examples of configurations of the information recording and reproduction apparatuses 1 and 2 of the embodiment will be described below with reference to FIGS. 5 and 6.

(Configuration and Operation of One-Format Compatible Optical Disk Apparatus)

Figure 5:
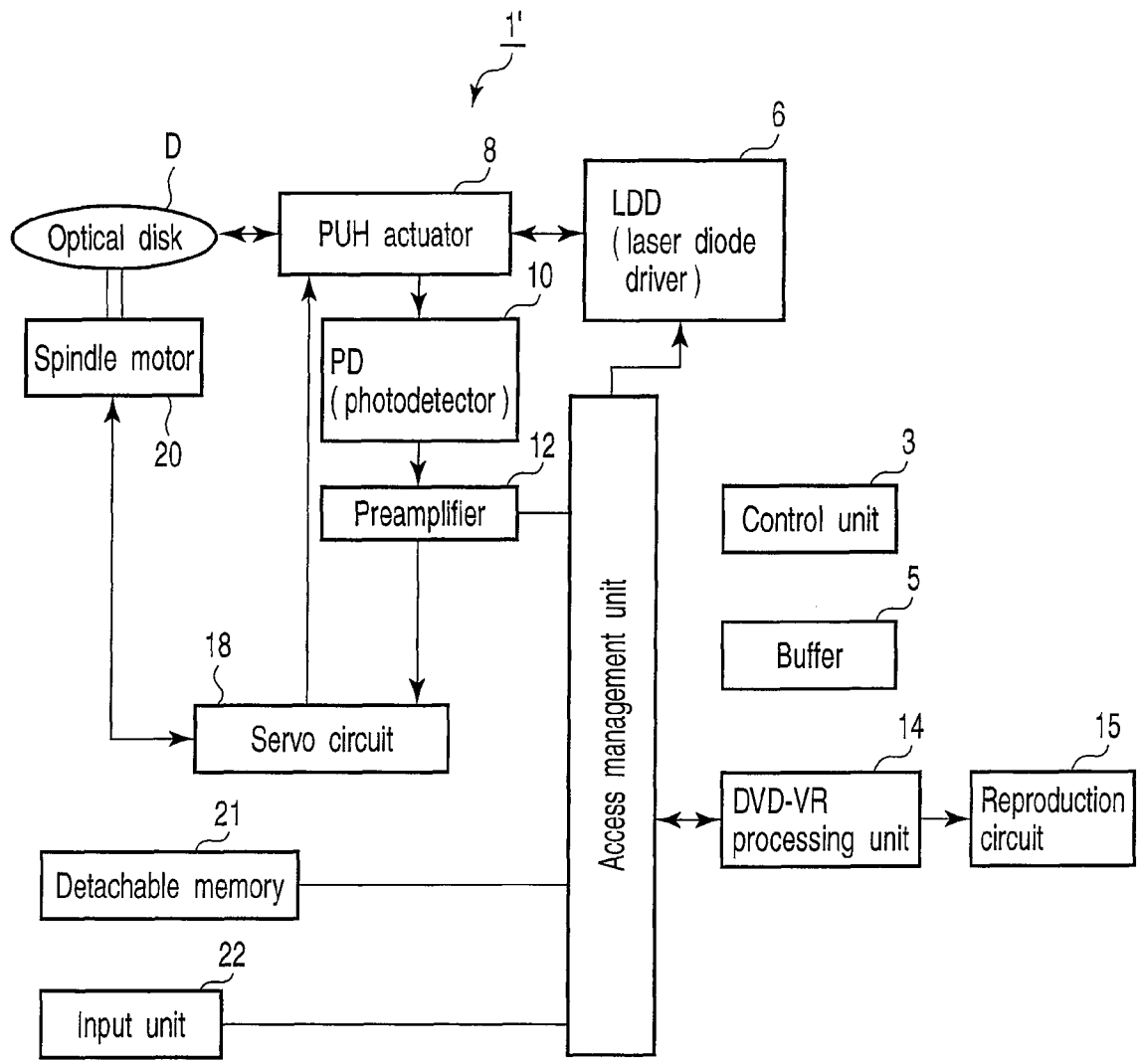
FIG. 5 is a block diagram showing an example of a configuration of another optical disk apparatus.

FIG. 5 is a block diagram showing an example of a configuration of an optical disk apparatus.

Referring to FIG. 5, the optical disk apparatus 1' of the embodiment includes the optical disk D, a control unit 3 which controls the whole operation, a buffer 5 in which a data stream read from the optical disk D is stored, an LDD 6 which controls a laser beam of an optical pickup, a PUH actuator 8 which controls an optical pickup head and a position of the optical pickup head, and a PD 10 which receives light of a detection signal detected from the optical pickup head and outputs the detection signal.

As shown in FIG. 5, the optical disk apparatus 1' also includes a preamplifier 12 which appropriately amplifies the detected signal, a DVD-VR processing unit 14 which decodes DVD-VR content information, a reproduction circuit 15 which processes a video signal and a sound signal which are the decoded read signal, a servo circuit 18 which controls a spindle motor 20 to a proper speed, the spindle motor 20, a detachable memory 21 in which the data stream is stored, and a communication unit 22 which obtains the data stream through a network such as the Internet.

In the optical disk apparatus 1, the laser beam emitted from the PUH (Optical Pick-Up Head) actuator 8 is focused on an information recording layer in the optical disk D rotated by the spindle motor 20 (laser beam is focused on a target recording layer by focus servo), thereby recording and reproducing the information. The light reflected from the optical disk D passes through an optical system of the PUH actuator 8 again, and the light is detected as an electric signal by the PD (photodetector) 10.

The preamplifier 12 amplifies the detected electric signal, and outputs the amplified electric signal to the servo circuit 18 and the DVD-VR processing unit 14. The servo circuit 18 generates servo signals such as a focus signal, a tracking signal, a tilt signal, and a rotating speed signal, and outputs the servo signals to focus, tracking, and tilt actuators (not shown) in the PUH actuator 8. The servo circuit 18 transmits the rotating speed servo signal to a driving circuit system of the spindle motor 20 to control a linear velocity of a laser beam spot to a predetermined value on the recording layer of the optical disk.

The control unit 3 reads data (user data) of a desired address position and records data in a desired address position based on address information. At this point, a recording waveform circuit (not shown) in the LDD (Laser Diode Driving Circuit) 6 modulates the recording data into a recording waveform control signal suitable to the optical disk recording. Based on the modulated signal, the LDD 6 causes the laser diode to emit the light to record information in the optical disk D.

(Configuration and Operation of Plural-Format Compatible Optical Disk Apparatus)

Next, a configuration and an operation of a plural-format compatible optical disk apparatus will be described. FIG. 6 is a block diagram showing an example of a configuration of the optical disk apparatus of the embodiment.

As shown in FIG. 6, the optical disk apparatus 2' of the embodiment includes the optical disk D, the control unit 3 which controls the whole operation, the buffer 5 in which the data stream read from the optical disk D is stored, the LDD 6 which controls the laser beam of the optical pickup, the PUH actuator 8 which controls the optical pickup head and the position of the optical pickup head, and the PD 10 which receives the light of the detection signal detected from the optical pickup head and outputs the detection signal.

As shown in FIG. 6, the optical disk apparatus 2' of the embodiment also includes the preamplifier 12 which appropriately amplifies the detected signal, the DVD-VR processing unit 14 which decodes DVD-VR content information, the reproduction circuit 15 which processes the video signal and sound signal which are the decoded read signal, an HD DVD-VR processing circuit 16 which decodes HD DVD-VR content information by an AACS (Advanced Access Content System) processing, a reproduction circuit 17 which processes the video signal and sound signal which are the decoded read signal, the servo circuit 18 which controls the spindle motor 20 to a proper speed, the spindle motor 20, the detachable memory 21 in which the data stream is stored, and the communication unit 22 which obtains the data stream through the network such as the Internet.

As shown in FIG. 6, the optical disk apparatus 2' of the embodiment also includes a DVD-VR warning information generation unit 23 which generates DVD-VR warning information described later and a DVD-VR warning information detection unit 24 which detects the DVD-VR warning information.

In the optical disk apparatus 2' of the embodiment, the laser beam emitted from the PUH (Optical Pick-Up Head) actuator 8 is focused on the information recording layer in the optical disk D rotated by the spindle motor 20 (laser beam is focused on the target recording layer by the focus servo), thereby recording and reproducing the information. The light reflected from the optical disk D passes through the optical system of the PUH actuator 8 again, and the light is detected as the electric signal by the PD (photodetector) 10.

The preamplifier 12 amplifies the detected electric signal, and outputs the amplified electric signal to the servo circuit 18 and the DVD-VR processing unit 14. The servo circuit 18 generates the servo signals such as the focus signal, the tracking signal, the tilt signal, and the rotating speed signal, and outputs the servo signals to the focus, tracking, and tilt actuators (not shown) in the PUH actuator 8. The servo circuit 18 transmits the rotating speed servo signal to the driving circuit system of the spindle motor 20 to control the linear velocity of the laser beam spot to a predetermined value on the recording layer of the optical disk.

The control unit 3 reads data (user data) of a desired address position and records data in a desired address position based on address information. At this point, the recording waveform circuit (not shown) in the LDD (Laser Diode Driving Circuit) 6 modulates the recording data into the recording waveform control signal suitable to the optical disk recording. Based on the modulated signal, the LDD 6 causes the laser diode to emit the light to record information in the optical disk D.

<Example of Warning Process Performed by Optical Disk Apparatus According to One Embodiment of the Invention>

An example of a warning process performed by the optical disk apparatus 2' of the embodiment will be described with reference to a flowchart. FIG. 7 is an explanatory view showing an example of a content list shown by the optical disk apparatus of the embodiment. FIGS. 8 and 9 are explanatory views showing examples of a warning screen generated by the optical disk apparatus of the embodiment.

Figure 10:
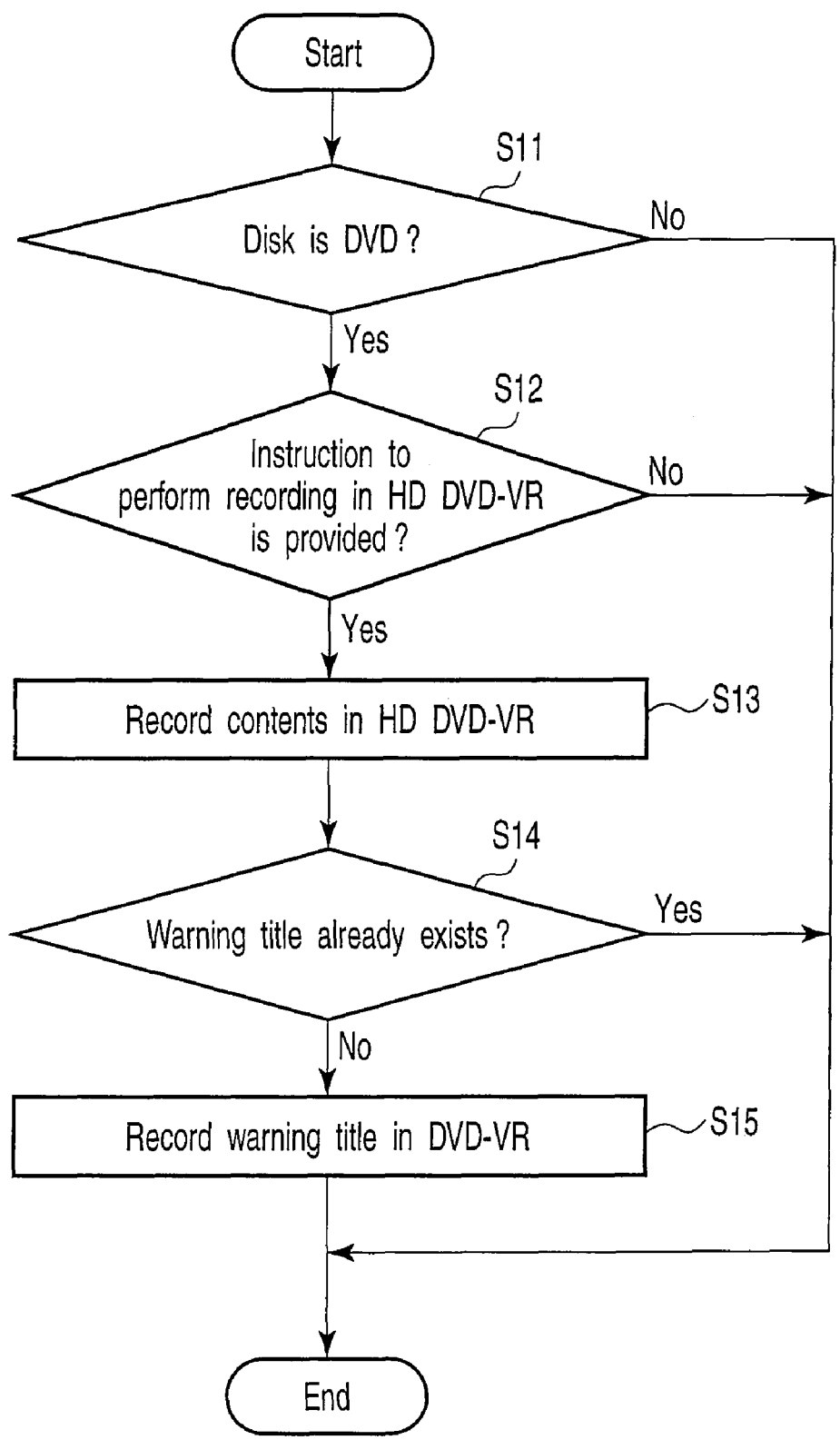
FIG. 10 is a flowchart showing an example of a warning title generating process performed by the optical disk apparatus of the embodiment.
Figure 11:
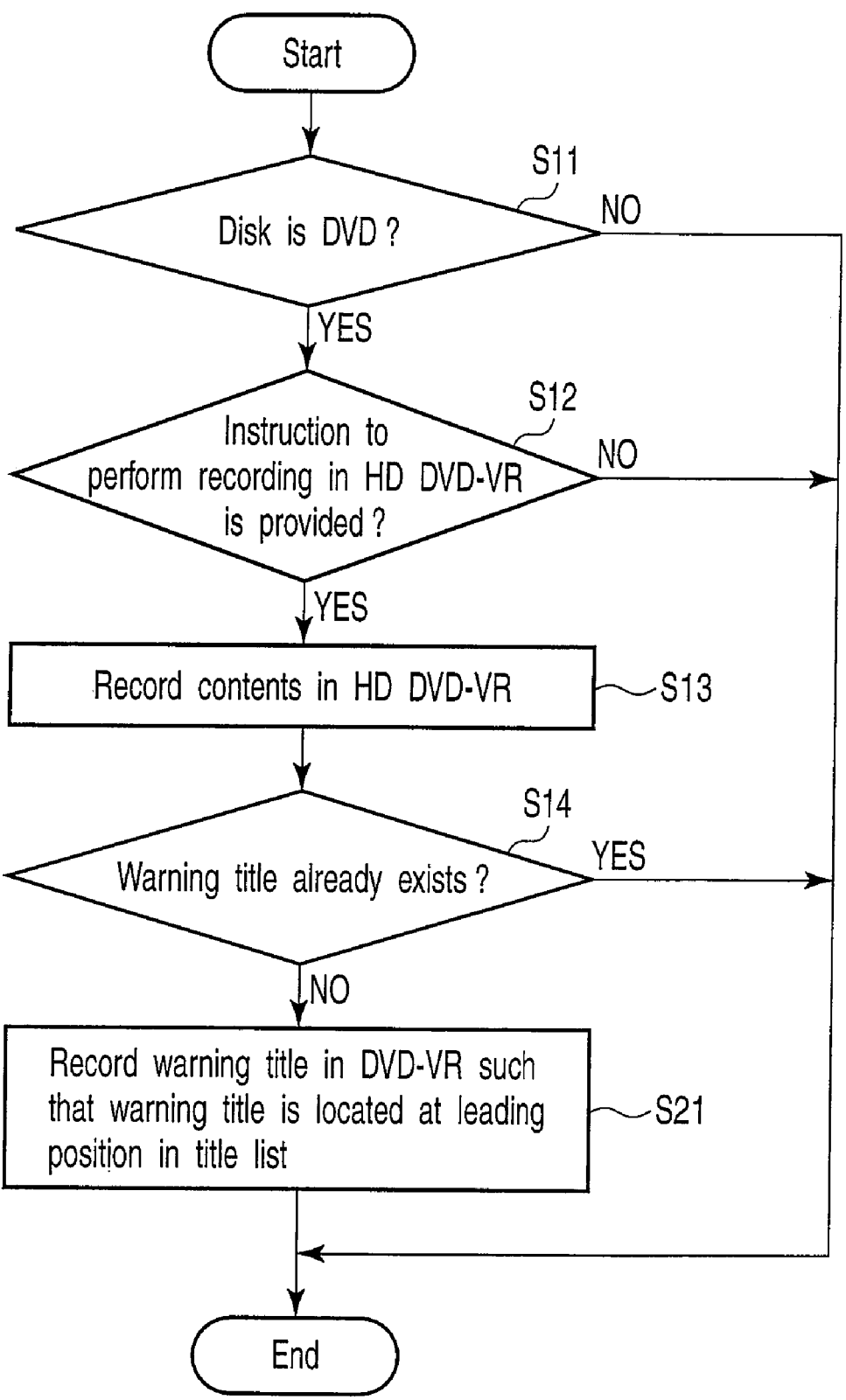
FIG. 11 is a flowchart showing another example of the warning title generating process performed by the optical disk apparatus of the embodiment.
Figure 12:
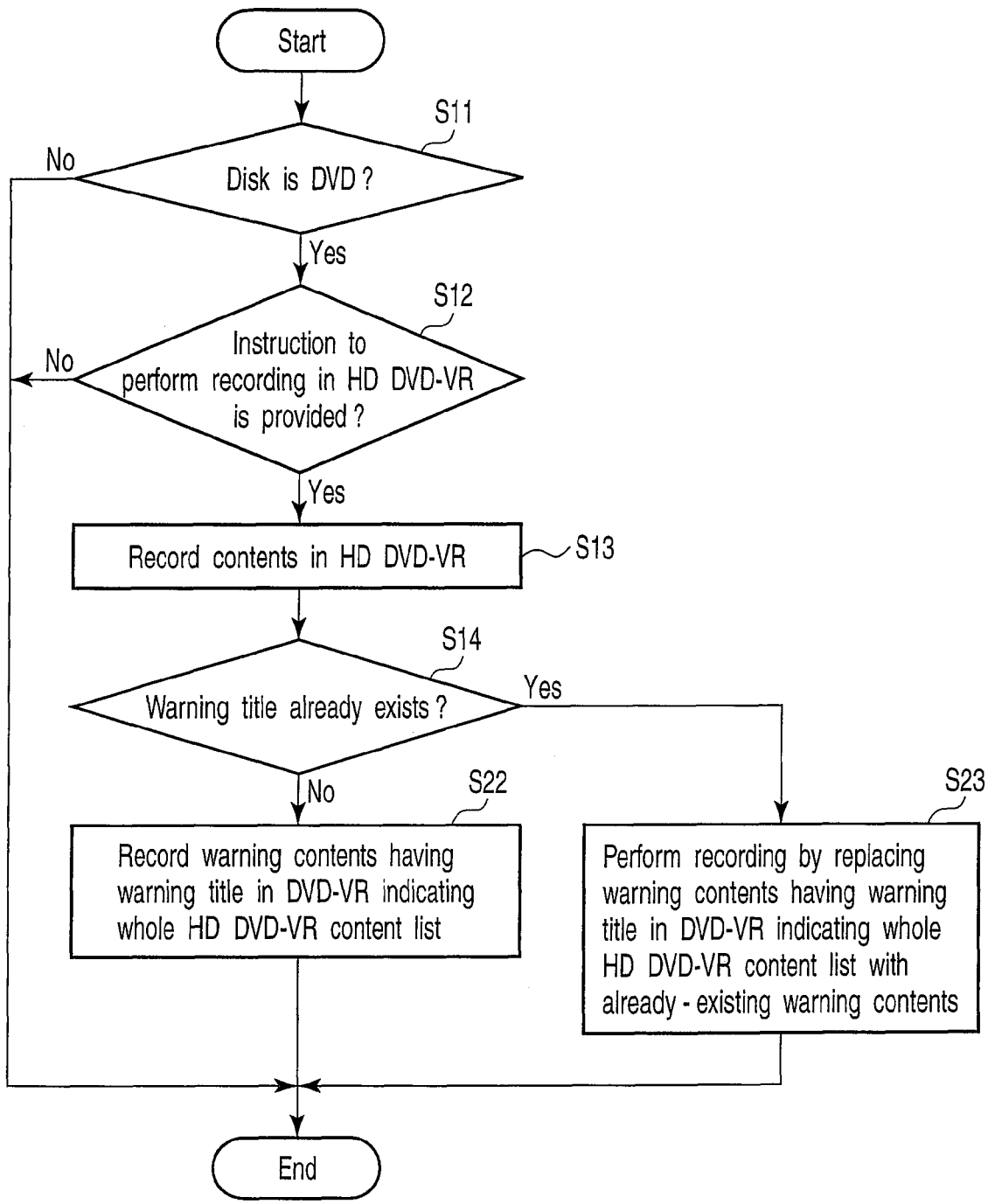
FIG. 12 is a flowchart showing another example of the warning title generating process performed by the optical disk apparatus of the embodiment.
Figure 13:
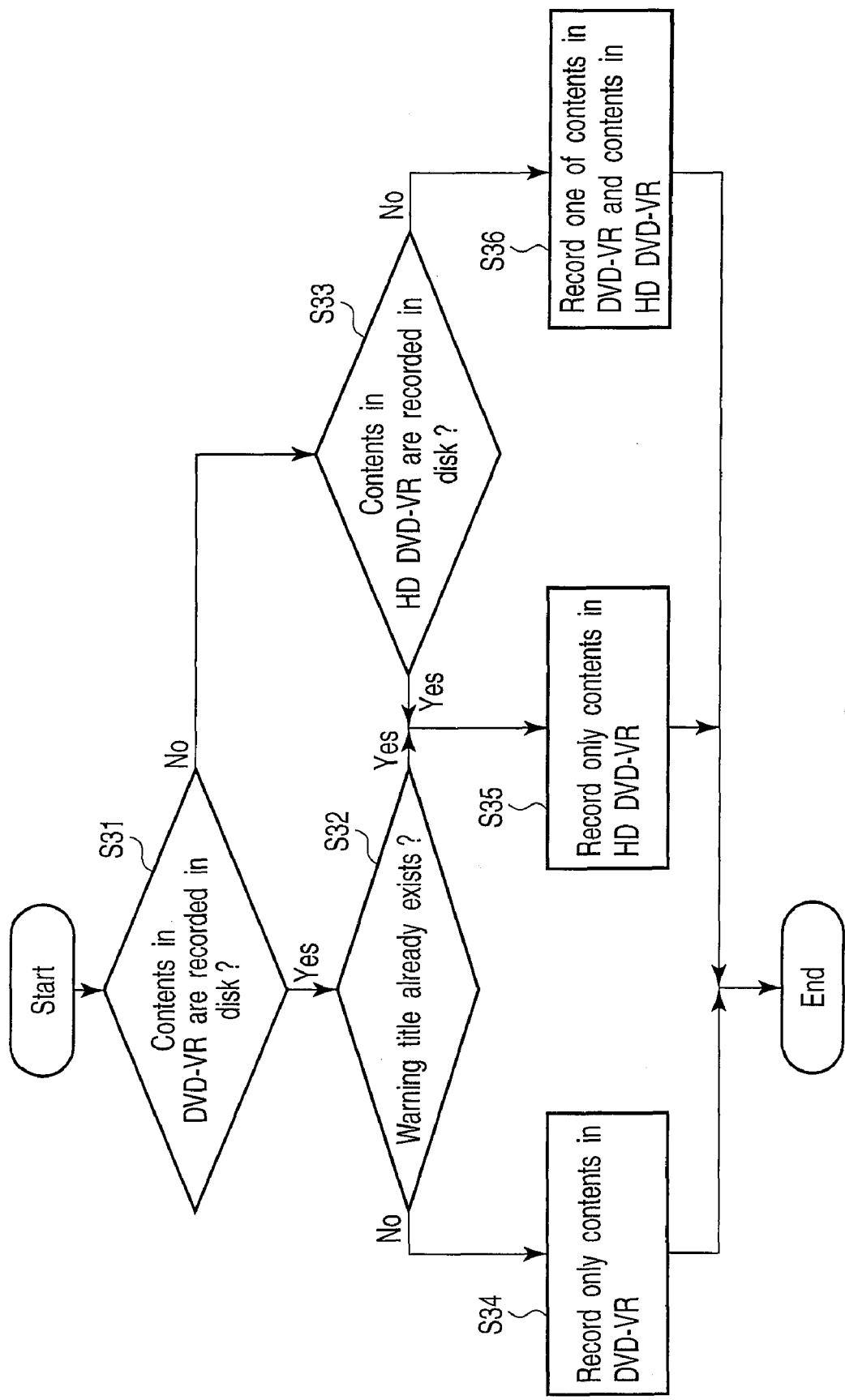
FIG. 13 is a flowchart showing an example of a recording process performed by the optical disk apparatus of the embodiment.

FIGS. 10 to 12 are flowcharts showing examples of a warning title generating process performed by the optical disk apparatus of the embodiment. FIG. 13 is a flowchart showing an example of a recording process performed by the optical disk apparatus of the embodiment.

Each step of the flowcharts shown in FIGS. 10 to 13 can be replaced by a circuit block, and therefore all steps of each flowchart can be redefined as blocks.

Warning Information Recording Process

The optical disk apparatus 2' of the embodiment records the warning information such as a warning title according to the following procedure. For example, the optical disk apparatus 2' is an HD DVD-VR recorder which can record and reproduce the optical disk in HD DVD-VR and DVD-VR, and can perform the recording in the HD DVD-VR format and DVD-VR format to the legacy DVD.

As shown in the flowchart of FIG. 10, when the optical disk apparatus 2' receives a recording instruction, the control unit 3 and the DVD-VR warning information generation unit 23 determine whether or not the recording target optical disk is the legacy DVD (Step S11). When the control unit 3 and the DVD-VR warning information generation unit 23 determine that the recording target optical disk is the legacy DVD, the control unit 3 and the DVD-VR warning information generation unit 23 determine whether or not an instruction to perform the recording in the HD DVD-VR format is provided (Step S12). When the instruction to perform the recording in the HD DVD-VR format is provided, contents are recorded in the HD DVD-VR format in the optical disk D2 (Step S13). Then, the control unit 3 and the DVD-VR warning information detection unit 24 determine whether or not the warning information such as the warning title is already recorded in the recording target optical disk (Step S14). When the control unit 3 and the DVD-VR warning information detection unit 24 determine that the warning information such as the warning title is not recorded in the recording target optical disk, the control unit 3 and the DVD-VR warning information generation unit 23 generate the warning information such as the warning title to record the warning information in the target optical disk (Step S15).

FIG. 7 shows an example of the warning information such as the warning title. For example, a warning title K can be displayed by the DVD-VR recorder 1' which can reproduce only contents in the DVD-VR format. A user can understand that contents in the HD DVD-VR format are recorded in the legacy DVD by the warning title K, although the user cannot usually recognize that contents in the HD DVD-VR format are recorded in the legacy DVD. Therefore, the warning information prevents the wrong format from deleting the contents in the HD DVD-VR format.

The warning information has effect only by the warning title K as shown in FIG. 7. Additionally, a warning screen R such as "Data is recorded in first format (such as HD DVD-VR) in this disk. Although data is not displayed on second format (such as DVD-VR) compatible player, perform deletion or initialization after contents are confirmed with first format compatible player." is preferably provided as shown in FIG. 8. That is, when the user specifies the warning title K to perform the reproduction, the warning screen R is displayed as shown in FIG. 8, which allows the user to know the existence of the contents in the HD DVD-VR format which cannot usually be recognized in the screen.

Furthermore, in Step S21 of a flowchart of FIG. 11, the control unit 3 and the DVD-VR warning information generation unit 23 preferably record the warning title K in a leading position on a title list of the optical disk D2 such that the user does not overlook the warning title K.

Furthermore, in Step S22 of a flowchart of FIG. 12, the control unit 3 and the DVD-VR warning information generation unit 23 preferably record the warning information in the DVD-VR format indicating the whole HD DVD-VR content list. Preferably the pieces of information such as the content title name, the recording date and time, and the time which are currently recorded in the HD DVD-VR format in the legacy DVD are simultaneously displayed as shown by a warning screen R2 of FIG. 9. Therefore, the user can know the specific contents in the HD DVD-VR format.

In the case where the warning information is included in the HD DVD-VR content list, when the warning information already exists (Step S14), it is necessary for the control unit 3 and the DVD-VR warning information generation unit 23 to perform the recording by replacing the HD DVD-VR content list with the already-existing warning contents in the DVD-VR format after updating the HD DVD-VR content list (Step S23).

Restriction of Recording Format

In the optical disk apparatus 2' of the embodiment, preferably restrictions are imposed on the recording format such that many recording formats are not diffused.

In the optical disk apparatus 2', as shown in a flowchart of FIG. 13, the control unit 3 determines whether or not contents in the DVD-VR format are recorded in the optical disk (Step S31). When the control unit 3 determines that the contents in the DVD-VR format are recorded in the optical disk, the control unit 3 determines whether or not the warning title already exists in the optical disk (Step S32). When the control unit 3 determines that the warning title does not exist in the optical disk, the flow goes to Step S34 to preferably record only the contents in the DVD-VR format.

When the control unit 3 determines that the warning title already exists in Step S32, the flow goes to Step S35 to preferably record only the contents in the HD DVD-VR format.

When the control unit 3 determines that the contents in the DVD-VR format are not recorded in the optical disk in Step S31, the flow goes to Step S33, and the control unit 3 determines whether or not contents in the HD DVD-VR format are recorded in the optical disk. When the control unit 3 determines that the contents in the HD DVD-VR format are recorded in the optical disk, the flow goes to Step S35 to preferably record only the contents in the HD DVD-VR format.

When the control unit 3 determines in Step S33 that the contents in the HD DVD-VR format are not recorded in the optical disk, the flow goes to Step S36 to preferably record one of the contents in the HD DVD-VR format and the contents in the DVD-VR format.

Thus, the control unit 3 recognizes how the warning information and contents in each format are recorded in the optical disk, and the restrictions are imposed on the recording in each format, so that the recording can be performed without diffusing the many recording formats.

Although those skilled in the art can realize the invention by various embodiments described above, those skilled in the art can easily make various modifications of the embodiments and applies the invention to various embodiments without inventive ability. Accordingly, the invention is not limited to the embodiments, but the invention covers a wide range which is consistent with the disclosed principles and novel features.

For example, in the embodiments, the DVD-VR format and the HD DVD-VR format are described in the recording and reproduction apparatus. However, the invention is not limited to the DVD-VR format and the HD DVD-VR format, but obviously the similar warning information can be generated in other application formats to obtain the same advantage.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical disk apparatus comprising:
   a recording unit which irradiates an optical disk with a laser beam to record information in a first format and a second format;
   a generation unit which generates warning information provided to a second disk apparatus capable of performing a read process of information recorded in the second format while not capable of performing the read process of information recorded in the first format, the warning information configured to indicate that information is recorded in the first format in the optical disk; and
   a control unit which:
   controls the recording unit to record the warning information generated by the generation unit in the second format in the optical disk apparatus when the information is recorded in the first format in the optical disk; and
   updates the warning information by adding title information on new contents to the warning information when the new contents are recorded in the first format.

* * * * *